United States Patent [19]

Magnuson

[11] Patent Number: 4,662,612
[45] Date of Patent: May 5, 1987

[54] FLAME CUTTING APPARATUS FOR COPING I-BEAMS

[75] Inventor: James M. Magnuson, Kankakee, Ill.

[73] Assignee: Peddinghaus Corporation, Bradley, Ill.

[21] Appl. No.: 850,839

[22] Filed: Apr. 11, 1986

[51] Int. Cl.⁴ .............................................. B23K 7/10
[52] U.S. Cl. ....................................... 266/48; 266/67; 266/77
[58] Field of Search ........................ 266/48, 52, 67, 77

[56] References Cited

U.S. PATENT DOCUMENTS

| | | | |
|---|---|---|---|
| 3,127,661 | 4/1964 | McConnell | 266/48 |
| 3,190,628 | 6/1965 | Litzka | 266/67 |
| 3,713,637 | 1/1973 | Cable et al. | 266/67 |
| 3,826,478 | 7/1974 | Paine | 266/48 |
| 4,317,560 | 3/1982 | Troyer | 266/48 |

*Primary Examiner*—Wayland Stallard
*Attorney, Agent, or Firm*—Dressler, Goldsmith, Shore, Sutker & Milnamow, Ltd.

[57] ABSTRACT

A flame cutting apparatus is disclosed which has been particularly configured for coping the end portion of a structural steel I-beam workpiece. The apparatus includes a roller conveyor for receiving the workpiece, and a frame positioned in association with the conveyor. A first carriage is provided which is movable along the frame in a direction parallel to the longitudinal axis of the workpiece. A pair of second carriages are provided on the first carriage, and are movable therewith, with the second carriages further being movable relative to each other in a horizontal direction transverse to the workpiece. Each of the second carriages is provided with a pair of flame cutting torches, with arrangements provided for further moving the torches vertically with respect to the workpiece. Associated automatic controls operate the apparatus such that movement of the cutting torches along three axes is effected for coping the workpiece.

17 Claims, 9 Drawing Figures

FIG_6

FLAME CUTTING APPARATUS FOR COPING I-BEAMS

TECHNICAL FIELD

The present invention relates generally to an apparatus for cutting structural steel members, and more particularly to an automated flame cutting apparatus suited for coping the end portions of structural I-beams.

BACKGROUND OF THE INVENTION

Structural steel I-beam members are commonly used in many forms of building construction. In such applications, it is typically necessary that end portions of some of the I-beam members be coped, such as by flame cutting, so that they can be fitted generally within and between the flange portions of an associated I-beam. The coped members can then be positioned perpendicularly to the associated I-beam and secured in position.

Depending upon the size and configuration of a particular building or other structure, it may be necessary to provide dozens or even hundreds of I-beam members having coped web and flange portions. In the past, suitable coping of the I-beam members has been a time-consuming, essentially manual task, with coping typically effected by use of a hand-held cutting torch. Considering the labor-intensive nature of such a job, it is very desirable to provide a flame cutting apparatus to facilitate efficient and automated coping of such structural members. Preferably, any apparatus intended for effecting coping of structural steel members should be configured for versatile use in handling structural members of varying dimensions and configurations. Further, it is important that such an apparatus be capable of accommodating the normal manufacturing tolerances and other irregularities typically exhibited by such structural members.

The flame cutting coping apparatus of the present invention has been particularly configured with the above goals in mind, and has been arranged for highly efficient and automated operation, and includes a number of specific features designed to promote precision and versatility despite the normal manufacturing tolerances exhibited by structural steel members.

SUMMARY OF THE INVENTION

The flame cutting coping apparatus embodying the principles of the present invention has been particularly configured for versatile and efficient handling and coping of structural steel members such as I-beams. Generally, the apparatus is configured to receive the end portion of an I-beam or other workpiece, and substantially automatically effect coping of the end portion by cutting the I-beam web and flanges. The apparatus includes an arrangement of selectively movable carriages which support a plurality of cutting torches, whereby the torches can be moved along any of three axes. Thus, as the I-beam workpiece is held in position, the cutting torches of the apparatus are sequentially operated to effect the desired coping.

In the illustrated embodiment, the present cutting apparatus includes a roller conveyor for receiving a workpiece such as an I-beam having a web extending between spaced flanges. Clamping mechanisms are provided in operative association with the conveyor for clamping the workpiece in a fixed position thereon, with the I-beam preferably positioned so that its web portion is horizontally disposed.

The present apparatus further includes a frame positioned in association with the roller conveyor, with the frame extending upwardly beyond the conveyor. The frame supports a generally elongated first carriage which is mounted on the frame so that the carriage is positioned above and generally spans the roller conveyor.

The first carriage is mounted on the apparatus frame for movement along an X-axis parallel to the longitudinal axis of the workpiece to be coped. In the illustrated embodiment, controlled movement of the first carriage along the X-axis is provided by means of an X-axis servo-drive arrangement which comprises a servo motor which drives an X-axis drive screw. An X-axis drive sleeve is mounted on the drive screw for movement therealong, with the drive sleeve operatively connected with the first carriage.

The present apparatus further includes a pair of second carriages which are mounted on the first carriage for movement therewith along the X-axis. Further, the pair of second carriages are movable relative to each other along the first carriage along a horizontal Y-axis perpendicular to the X-axis, with the Y-axis thus extending transversely of the workpiece.

In the preferred form, each second carriage comprises a flange torch frame and a web torch frame positioned substantially adjacent thereto. The flange torch and web torch frames of each second carriage are movable along the Y-axis of the apparatus. An arrangement is provided for moving the second carriages relative to each other along the first carriage, whereby the flange torch frame and web torch frame of each second carriage move together relative to the torch frames of the other second carriage.

Each of the second carriages is provided with a pair of flame cutting torches. More specifically, a pair of web cutting torches are respectively mounted on the web torch frames of the second carriages for movement therewith along the X-axis and the Y-axis. Similarly, a pair of flange cutting torches are respectively mounted on the flange torch frames of the second carriages for movement therewith along the X-axis and the Y-axis.

The pair of web torches of the apparatus are generally vertically, downwardly oriented, and are thus positioned for flame cutting the web portion of the I-beam workpiece when the web portion of the I-beam is horizontally oriented in the apparatus. In distinction, the flange cutting torches of the apparatus are horizontally, inwardly directed in generally opposed relation to each other. Thus, the flange cutting torches are arranged to cut the flange portions of an I-beam positioned in the apparatus such that the flanges are vertically oriented.

As noted, selective movement of the cutting torches of the apparatus along three axes is contemplated while the associated I-beam workpiece is held in a fixed position. To this end, an arrangement of fluid rams is provided for relatively moving the second carriages along the first carriage along the Y-axis. Further, a Y-axis servo-drive arrangement is provided which is mounted on and extends generally between the second carriages. The Y-axis servo-drive arrangement provides precisely controlled movement of the web torch frames of the second carriages independently of the flange torch frames of the second carriages. Very precise control of the flame cutting provided by the web torches is thus effected.

Vertical movement of the web torches is effected by means of fluid rams which can raise and lower the web torches relative to their respective web torch frames. In this regard, each of the web torches is provided with an associated workpiece-engaging pad which is configured to engage the workpiece upon release of the associated fluid ram, whereby each of the web torches can effectively "float" on the associated workpiece. In this manner, the web torches can follow the contour of the workpiece, even though it may not be perfectly level, as the web torches are moved along the X-axis and Y-axis by the associated servo-drives.

In distinction, vertical movement of the inwardly-directed flange torches is preferably effected in a manner which affords more precise control than the fluid rams employed for floating vertical movement of the web torches. Accordingly, a Z-axis servo-drive arrangement is provided for effecting precisely controlled vertical movement of the flange torches. Like the X-axis and Y-axis servo-drive arrangements, drive screws are provided which are operatively connected with the flange torches for effecting control of the movement thereof.

Highly versatile and efficient use of the present apparatus is promoted by the manner in which the cutting torches of the apparatus can be "pre-positioned" or "referenced" relative to an associated workpiece, whereby suitable automatic controls can thereafter operate the various servo-drives.

In order to reference the first carriage relative to the workpiece, selectively extensible, workpiece-engaging probes are provided for contact with the end of the workpiece. The X-axis drive sleeve, which is mounted on the X-axis drive screw for movement therealong, is operatively connected with the associated first carriage by means of an X-axis adjusting fluid ram. By this arrangement, the position of the first carriage relative to the X-axis drive sleeve can be adjusted by extending the probes and pressurizing the adjusting ram until one or both of the probes engages the workpiece. A locking fluid ram is provided for thereafter locking the first carriage in this referenced position relative to the X-axis drive sleeve.

A similar arrangement is provided in association with the Z-axis servo-drive for the flange cutting torches. A pair of Z-axis drive sleeves are respectively mounted on each of two Z-axis drive screws, with the drive sleeves respectively operatively connected with the pair of flange torches by means of respective adjusting fluid rams and locking fluid rams.

The selectively-extensible probes of the apparatus are extended, and the pair of adjusting fluid rams operated whereby the probes engage the flanges of the I-beam workpiece. In this manner, the positions of the pair of flange torches relative to the respective Z-axis drive sleeves can be simultaneously but independently referenced and established. The locking fluid rams for each of the flange torches are thereafter operated to lock each flange torch in the referenced position relative to its respective Z-axis drive sleeve. Thus, even though the pair of flange torches may not be horizontally aligned with each other, they are both in correct and corresponding alignment with the respective flanges of the workpiece. Subsequent operation of the Z-axis servo-drive thus moves the flange torches in concert for simultaneously cutting the I-beam flanges.

Numerous other features and advantages of the present invention will become readily apparent from the following detailed description, the accompanying drawings, and the appended claims.

DETAILED DESCRIPTION

Figure 1:
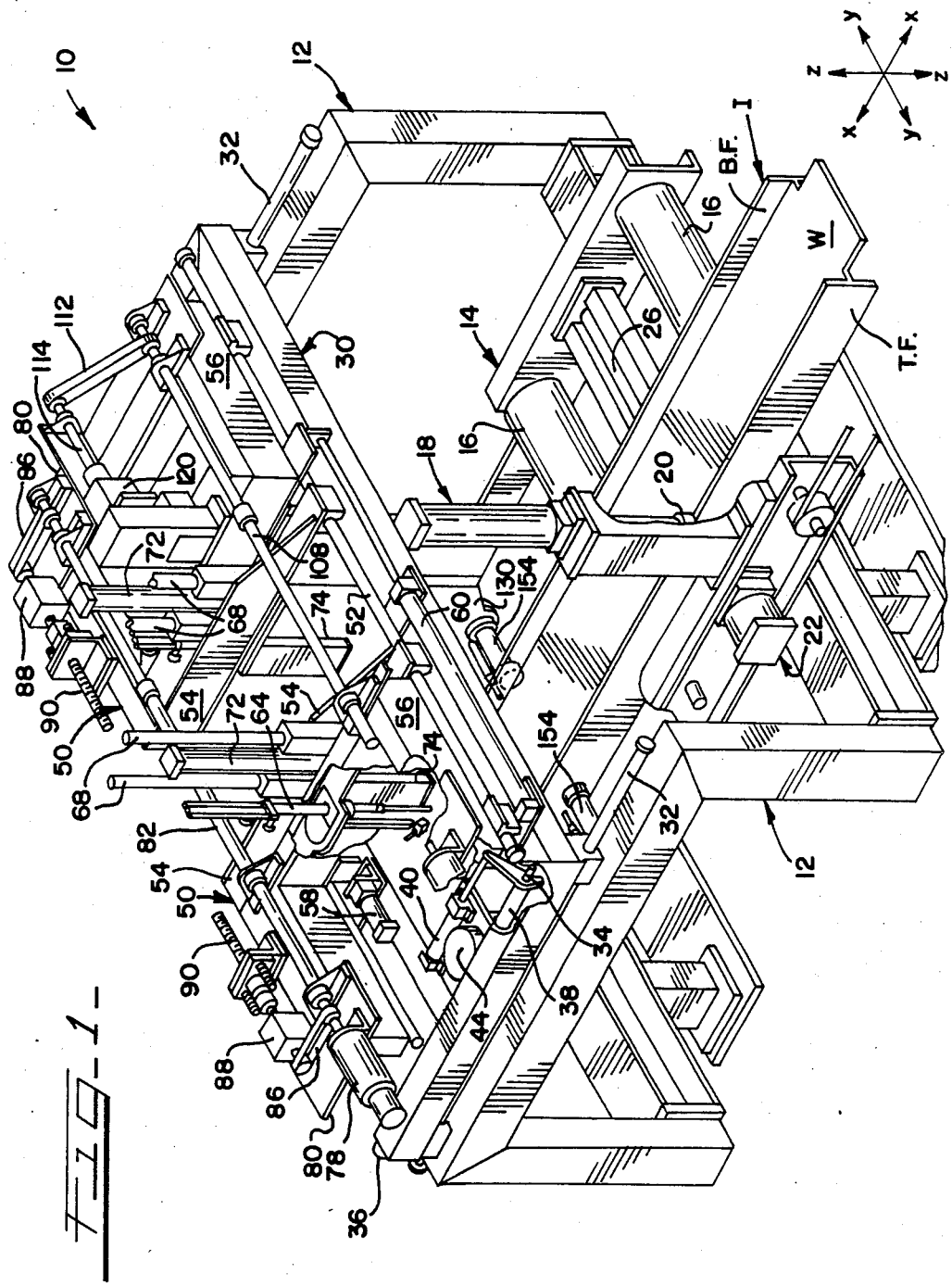
FIG. 1 is a perspective view of a flame cutting coping apparatus embodying the principles of the present invention.
Figure 2:
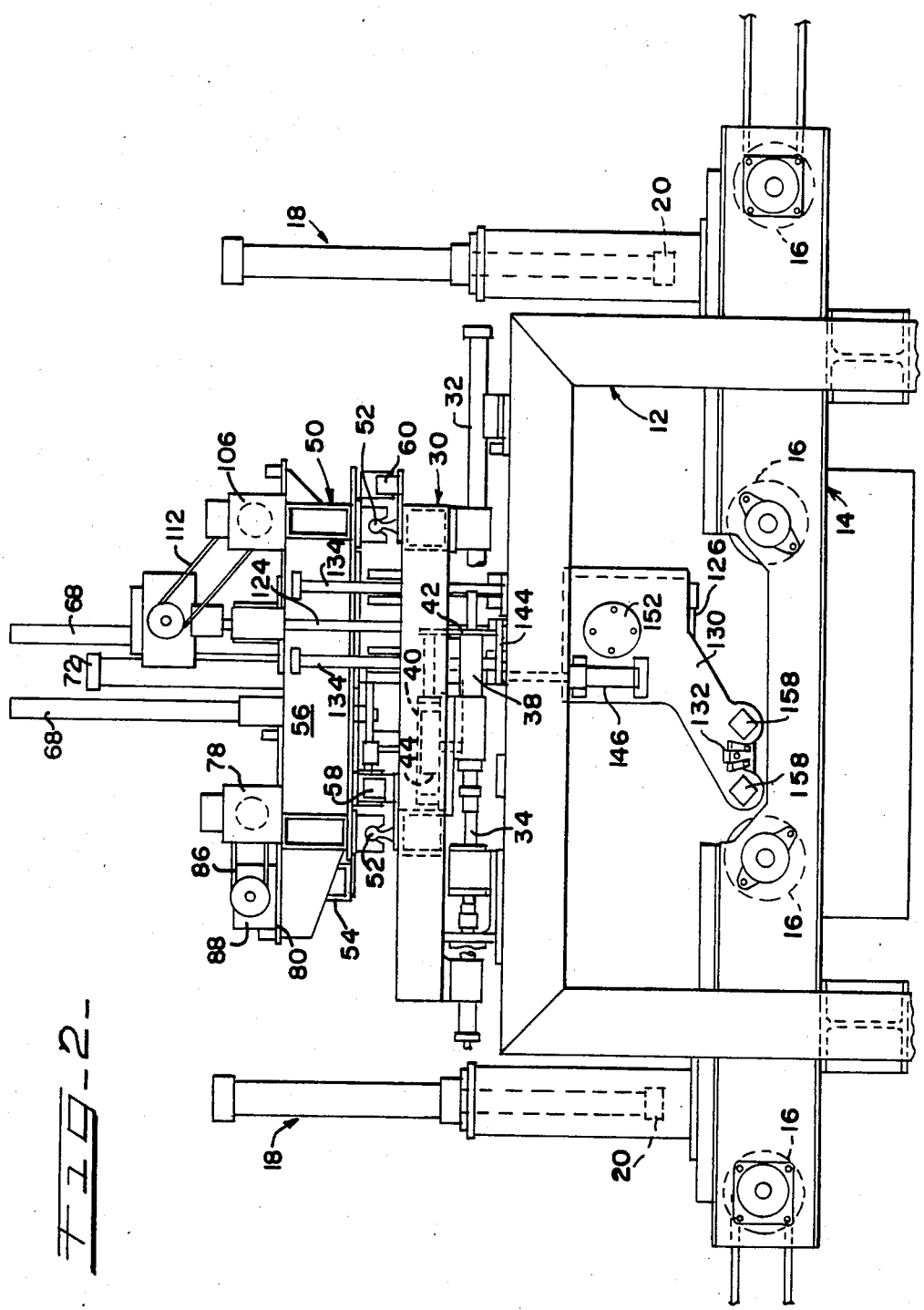
FIG. 2 is a side elevational view of the flame cutting apparatus shown in FIG. 1.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

For purposes of clarity of the present disclosure, it will be observed that not all components of the present apparatus are illustrated in all of the views of the appended drawings in which such components might otherwise appear. The relative positioning of the various components will be readily apparent from the various views, with a number of the views being of a diagrammatic nature to facilitate understanding of the present apparatus.

Referring first to FIG. 1, therein is illustrated the flame cutting apparatus 10 embodying the principles of the present invention. As noted, the present apparatus has been particularly configured for effecting flame cutting of structural steel members having an I-beam cross-section (sometimes referred to as H-beams). As illustrated in FIG. 1, the present apparatus includes a frame 12 which supports a roller conveyor 14 for receiving a workpiece upon which flame cutting is to be effected. In this regard, the present apparatus is preferably configured such that a workpiece such as I-beam I be received in the apparatus such that the web W of the I-beam is horizontally oriented, with the top flange T.F. and the bottom flange B.F. of the I-beam oriented vertically as shown. The top flange of the I-beam is ordinarily that one of the flanges which will be at the "top" when the I-beam is put in place in a structure.

As further illustrated in FIG. 1, the present apparatus is configured to effect coping of an I-beam such as to a form illustrated on the exposed end portion of the I- beam in FIG. 1. Coping is typically effected so that the end portion of the I-beam can be fitted into cooperation with another I-beam in a structure. Thus, an I-beam is typically coped such that two generally rectangular portions of its web W are removed, with corresponding end portions of the adjacent top and bottom flanges also removed. While the present apparatus has been particularly configured for coping a structural steel I-beam to this form, and will thus be described with particular reference to cutting of the web and flange portions of an I-beam, it will be recognized that an apparatus embodying the principles disclosed herein can readily be arranged to effect flame cutting of structural members configured other than as an I-beam in cross-section, and can be arranged to form copings of shapes other than as shown.

The present apparatus is configured such that cutting operations are effected by movement of cutting torches of the apparatus along three axes. Accordingly, and for clarity of the present disclosure, reference will be made to a horizontal X-axis which extends in a direction parallel to the longitudinal axis of the workpiece to be cut, a horizontal Y-axis extending perpendicularly to the X-axis (and thus transversely of the workpiece), and a vertical Z-axis extending perpendicularly to the X-axis and the Y-axis.

With particular reference to FIGS. 1-4, the I-beam workpiece is received on spaced rollers 16 of roller conveyor 14, with at least some of the rollers 16 preferably power-driven to facilitate movement of the workpiece into position in the apparatus. Once the workpiece has been moved into position for cutting, the workpiece is preferably firmly held in a substantially fixed position so that the cutting torches can be "referenced" relative to the workpiece, and cutting thereafter commenced.

To this end, the apparatus includes a pair of vertical workpiece clamps 18 generally disposed at opposite ends of the conveyor 14, with each vertical clamp 18 including a clamping foot 20 adapted to engage the top flange of the I-beam workpiece for holding the workpiece in position on the roller conveyor. Each of the workpiece clamps 18 preferably comprises a pneumatic fluid ram, with the provision of a pair of the clamps promoting versatile use since a workpiece may extend into the apparatus from either direction. In the preferred practice, an I-beam is introduced into the apparatus from one end, clamped into position with one of the clamps 18, and subsequently coped. The workpiece can then be released and conveyed entirely through the apparatus so that its opposite end is in position for coping. The other one of the clamps 18 can then be used for holding the workpiece in position.

Figure 4:
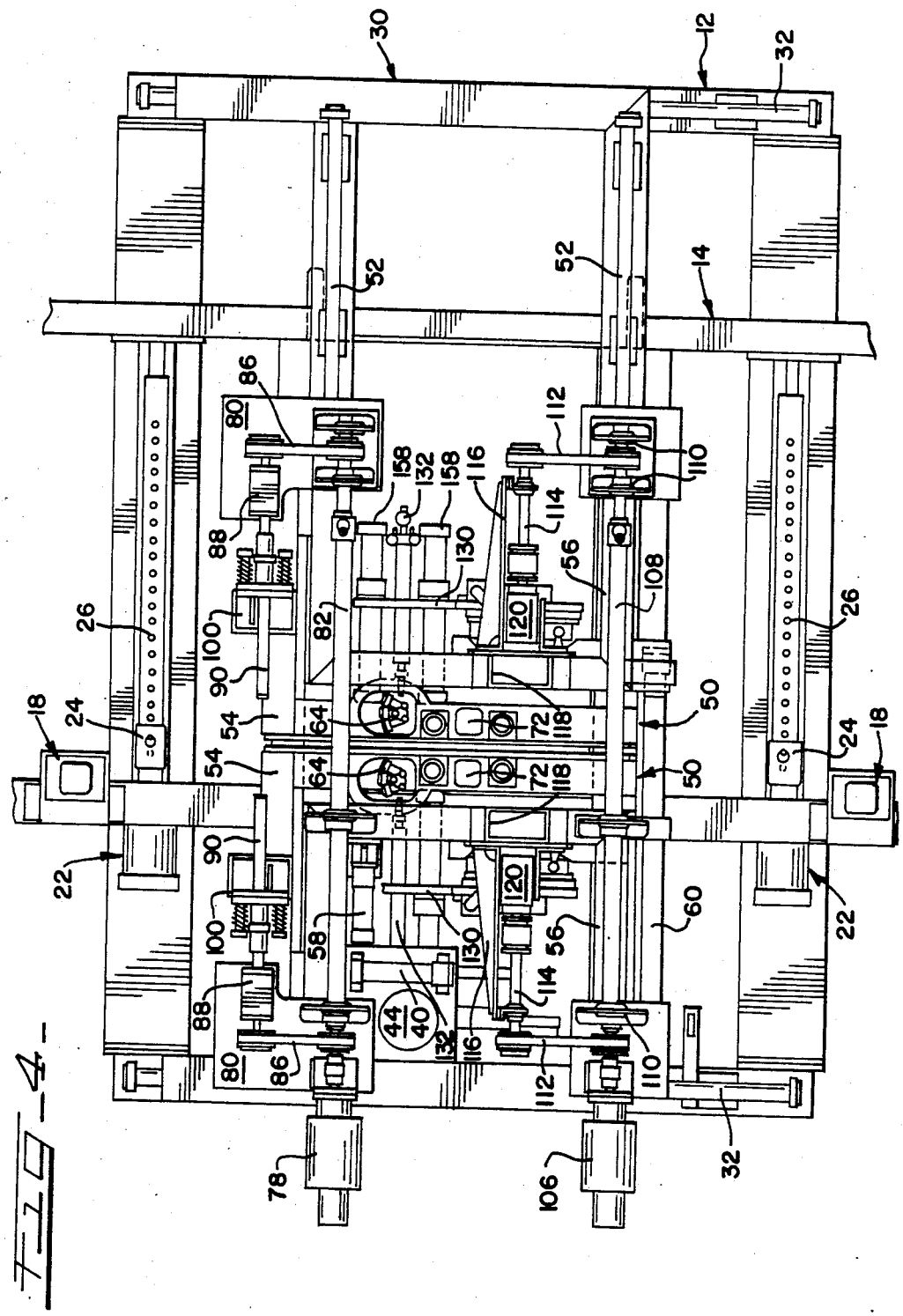
FIG. 4 is a top plan view of the present flame cutting apparatus.

A pair of horizontal workpiece clamps 22 are similarly provided for holding th workpiece in position. Horizontal clamps 22 are likewise positioned generally at or on roller conveyor 14. Each clamp 22 preferably comprise a pneumatic fluid ram operatively connected with a clamping pad 24 by means of an elongated actuating rod 26 which extends generally across the roller conveyor. As best shown in FIG. 4, the clamping pad 24 for each horizontal clamp 22 can be suitably adjustably positioned within the respective actuating member 26, with the clamps thus being suited for use with structural members which vary substantially in dimension, while still permitting use of fluid rams having a relatively short working stroke.

In order to mount the cutting torches of apparatus 10 for selective movement, the apparatus includes a first generally rectangular carriage 30 mounted on frame 12 such that the carriage spans roller conveyor 14. First carriage 30 is mounted on frame 12 for movement with respect thereto along the X-axis. To this end, a pair of X-axis guides 32 are mounted on frame 12 on respective opposite sides of roller conveyor 14, with the first carriage 30 carried by the guides 32 by means of suitable linear bearings or the like.

Precisely controlled movement of first carriage 30 along the X-axis is effected by means of an X-axis servo-drive arrangement. In particular, the servo-drive includes an elongated, X-axis drive screw 34 which is mounted on frame 12 (see FIG. 3), and which can be precisely driven by means of an X-axis servo motor 36 operatively connected thereto. The servo-drive further includes an X-axis drive sleeve 38 mounted on the drive screw 34 and threadably connected thereto for movement along the drive screw as it is rotated.

Notably, the X-axis drive sleeve 38 is not fixedly connected to first carriage 30, but rather is adjustably operatively connected to the carriage. More specifically, an X-axis adjusting fluid ram 40, which is preferably pneumatic, is mounted on first carriage 30, and is operatively connected with X-axis drive sleeve 38 by means of an arm 42. Further, an X-axis locking fluid ram 44 is provided, the actuation and pressurization of which acts to fixedly lock first carriage 30 relative to X-axis drive sleeve 38. Locking fluid ram 44 preferably comprises a pneumatic "pancake cylinder" having a relatively large bore-to-stroke ratio.

The precise arrangement of this adjusting and locking mechanism will be additionally described hereinafter in connection with similar adjusting and locking mechanisms used in another portion of the present coping apparatus. It is important to appreciate, however, that the provision of this adjusting arrangement greatly enhances the versatility and efficiency of the present coping apparatus. In view of the substantial weight and inertial mass of a typical structural steel workpiece, it can be difficult to position the workpiece within the apparatus with the degree of precision desired for the copings to be formed in the workpiece. Thus, it was recognized that relatively imprecise positioning of a workpiece in the apparatus would be permissible if the cutting torches of the apparatus were "referenced" or oriented relative to the workpiece after it is fixed in position, and before cutting commences.

Accordingly, adjusting fluid ram 40 is provided for moving first carriage 30 relative to X-axis drive sleeve 38 prior to initiation of cutting operations. Once this relative position has been established, locking ram 44 can be pressurized to fix carriage 30 relative to drive sleeve 38. Thereafter, precise, controlled movement of the first carriage 30 can be effected by operation of servo motor 36 by associated programmed controls for the apparatus. While such associated controls are not illustrated, their operation and configuration will be readily apparent to those familiar with the automatic controls typically provided for machine tools and the like.

Bearing in mind that movement of first carriage 30 provides movement of the cutting torches of the present apparatus along the X-axis parallel to the longitudinal axis of the workpiece, the manner in which the torches can be moved along the Y-axis generally transversely of the workpiece will now be described.

Apparatus 10 includes a pair of second carriages, each generally designated 50, which are mounted on the first carriage 30 for movement with the first carriage along the X-axis, and for movement of the carriages 50 relative to each other and relative to the first carriage 30 along the Y-axis. To this end, a pair of elongated Y-axis guides 52 are provided which are mounted on the first carriage 30.

Each of the second carriages 50 comprises a generally L-shaped web torch frame 54, and a respectively associated generally U-shaped flange torch frame 56. The web torch and flange torch frames of each of the carriages 50 are mounted for movement on the Y-axis guides 52. Certain operational aspects of the present apparatus call for movement of the frames 54 and 56 of each second carriage 50 together on the Y-axis guides. During other times, it is desirable that the web torch frames 54 move together independently of the flange torch frames 56.

Movement together of both frames 54 and 56 of each second carriage 50 is provided by means of a pair of preferably pneumatic Y-axis fluid rams respectively operatively connected with the second carriages 50. A relatively short stroke Y-axis fluid ram 58 is operatively connected with flange torch frame 54 of the second carriage 50 disposed toward the left-hand side of the apparatus, referring to the orientation of FIGS. 3 and 4. This side of the apparatus is generally referred to as the "top flange" side, since the top flange of an I-beam to be cut is intended to be positioned on roller conveyor 14 generally at this side of the apparatus.

In contrast, a relatively long stroke Y-axis fluid ram 60 is operatively connected with the flange torch frame 54 of the other of the second carriages 50. The provision of this relatively long stroke ram permits this one of the second carriages 50 to be moved a sufficiently great distance to permit the present apparatus to handle I-beams or other structural members within a wide range of differing cross-sectional dimensions. By way of example, use of a fluid ram 60 having a stroke on the order of 30 inches is contemplated.

Additionally, Y-axis fluid rams 58 and 60 function during flame cutting to urge the flange torches of the present apparatus generally toward the respective flanges to be cut so that the torches tend to follow the contour of the flanges. This action will be later described in connection with a full cycle of operation of the present apparatus.

Figure 3:
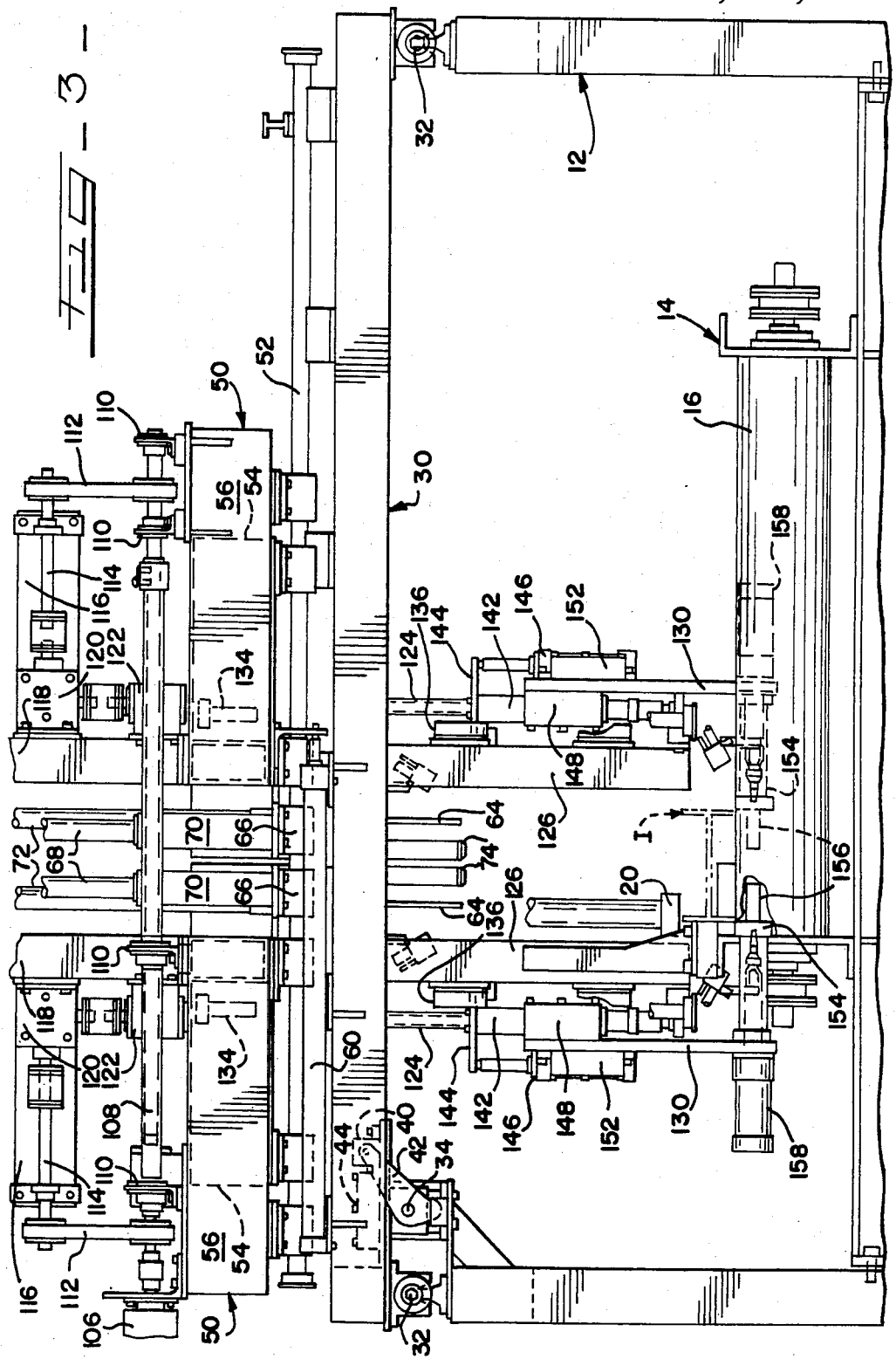
FIG. 3 is an end elevational view of the present flame cutting apparatus.
Figure 5:
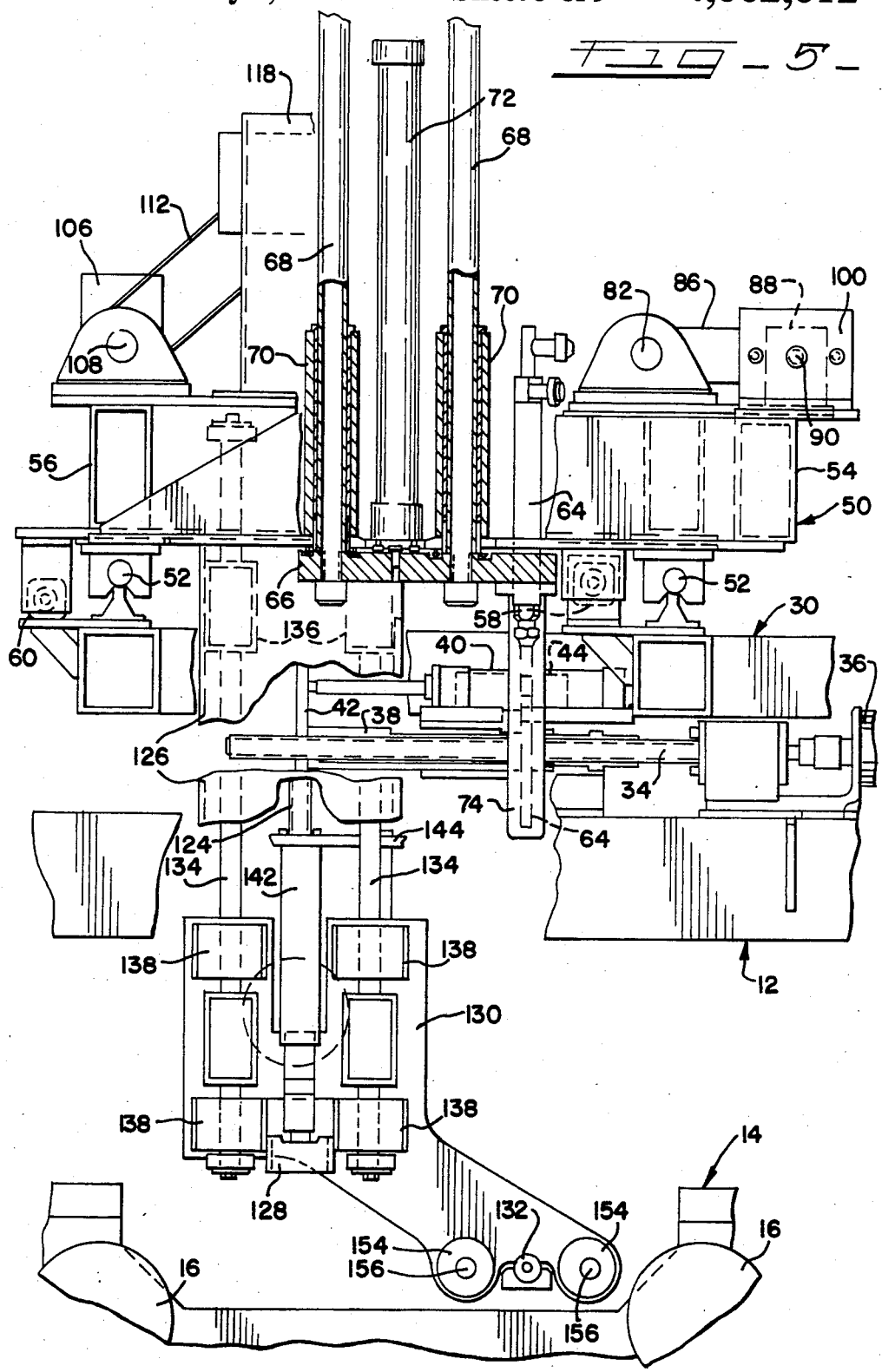
FIG. 5 is a partially cut-away and cross-sectional view taken generally along a vertical plane extending longitudinally through the present apparatus.
Figure 6:
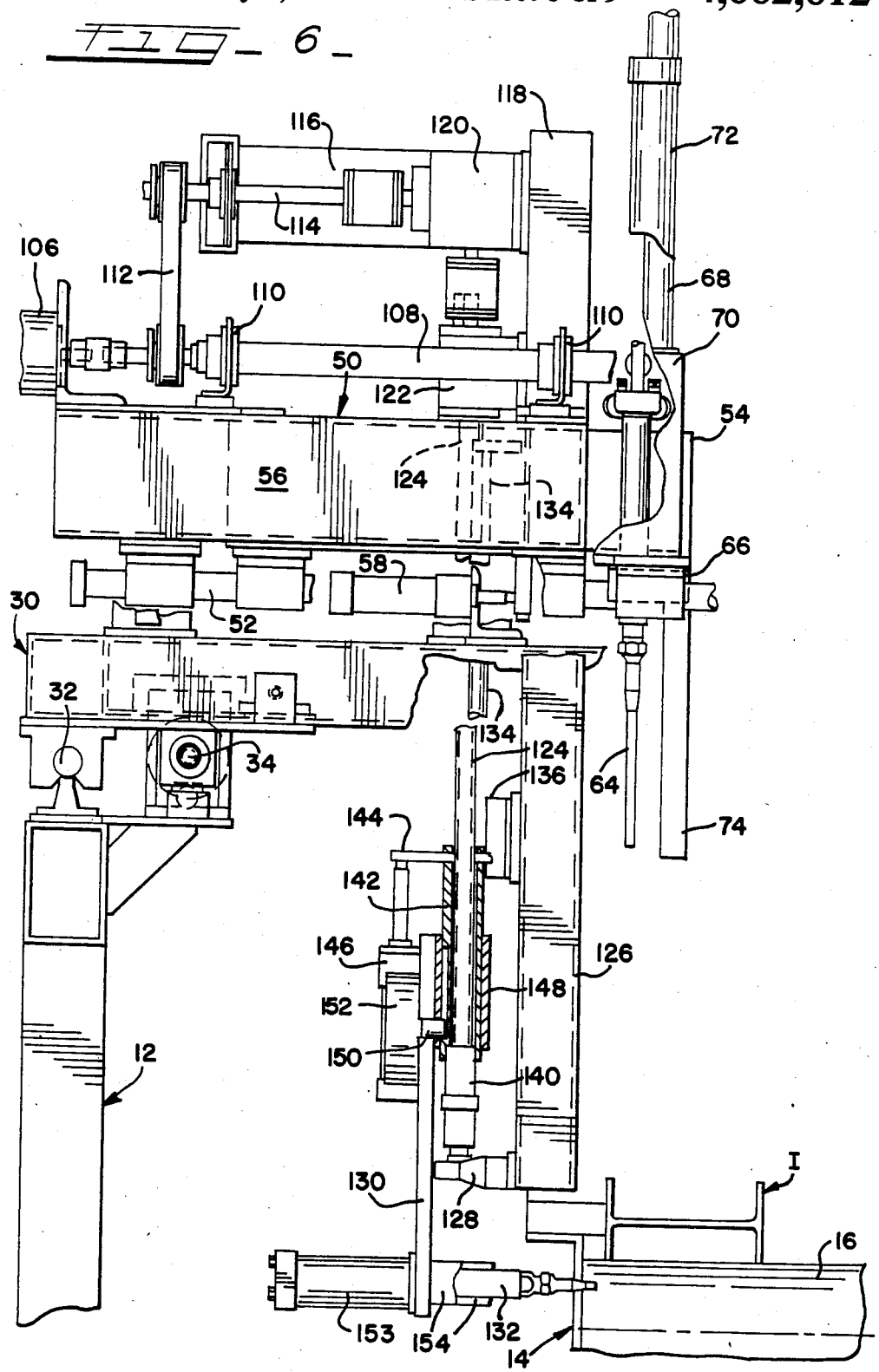
FIG. 6 is a partially cut-away and cross-sectional view taken in elevation illustrating a web cutting torch and a flange cutting torch of the present apparatus.

Efficient operation of the present apparatus is promoted by the provision of a pair of web cutting torches, each designated 64, whereby the "corners" of the I-beam web to be coped can be simultaneously cut. As best illustrated in FIGS. 3, 5, and 6, each of the web torches 64 is mounted on a respective one of the web torch frames 54 of the second carriages 50 by means of a respective web torch mount 66. In order to permit the web torches 64 to be moved vertically relative to the associated workpiece, a pair of vertically extending web torch guides 68 are provided and fixed to each of the web torch mounts 66. The web torch guides 68 are respectively slidably disposed within guide sleeves 70 affixed to the respective web torch frame 54.

Each of the web torches 64 preferably comprises an oxy-acetylene cutting torch of conventional design. Suitable acetylene and oxygen hoses, not shown, are provided for delivery of fuel to the torches, with the associated controls of the apparatus controlling the fuel flow as will be further described.

As will be appreciated, efficient cutting with this type of torch is promoted by optimally positioning the torch relative to the workpiece. To this end, each of the web torches 64 is preferably provided with a respective web torch fluid ram 72, and a respective web torch pad 74, each of which are operatively connected to the respective torch mount 66.

Web torch fluid rams 72 provide vertical movement of the web torches so that the torches can be positioned atop the horizontally oriented web portion of the I-beam workpiece. In order to maintain the desired relative positioning of the torches to the workpiece, the torch pads 74 are provided for engagement with the workpiece after release of the fluid rams 72. The rams 72 are maintained in a non-fixed, non-locked condition, whereby the web torches 64 effectively "float" as the respective torch pads 74 follow the contour of the workpiece during cutting.

As will be appreciated, the previously described X-axis servo-drive arrangement provides controlled movement of web torches 64 along the X-axis of the apparatus. Controlled movement of the web torches along the Y-axis of the apparatus is provided by a servo-drive arrangement which is mounted generally on the flange torch frames 56 of second carriages 50, and which is arranged to move the web torch frames 54 of the second carriages independently of their respective flange torch frames 56.

Figure 9:
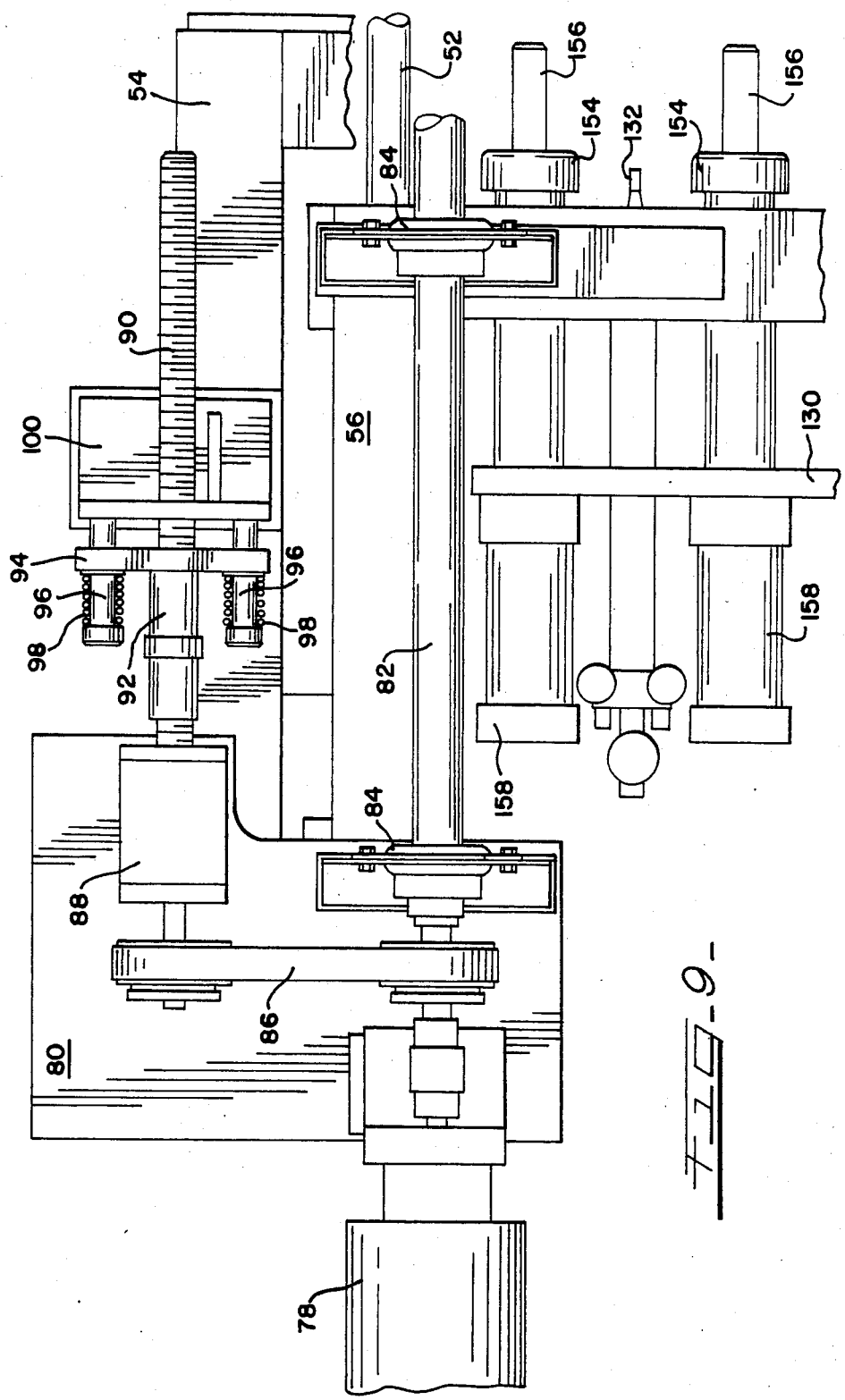
FIG. 9 is a diagrammatic, generally top plan view of a Y-axis servo-drive arrangement of the present apparatus.

As best illustrated in FIGS. 4 and 9, the Y-axis servo-drive arrangement comprises a Y-axis servo-drive motor 78 mounted on a support plate 80 fixed to the flange torch frame 56 of one of the second carriages 50, with a similar support plate 80 mounted on the flange torch frame 56 of the other second carriage 50. The servo-drive motor 78 is operatively connected to and drives a Y-axis telescopic shaft 82 supported by bearings 84. Notably, the provision of this telescopic shaft permits the single servo-drive motor 78 to be employed for effecting Y-axis movement of both web torch frames 56, while still permitting Y-axis movement of the second carriages 50 relative to each other on first carriage 30.

Drive belts 86 are operatively connected to the telescopic shaft 82 generally at opposite ends thereof, with the drive belts in turn operatively connected with a pair of Y-axis bearing assemblies 88 respectively mounted on support plates 80. The bearing assemblies, comprising suitable thrust bearings, are in turn operatively connected with respective oppositely-threaded Y-axis drive screws 90.

As best shown in FIG. 9, each of the Y-axis drive screws 90 has mounted thereon a respective Y-axis drive sleeve 92. Each drive sleeve 92 is in turn connected to a sleeve plate 94. A pair of pins 96 extend through the sleeve plate, with compression springs 98 respectively held in captive relation on the pins 96.

Pins 96 are in turn fixedly connected to an angle member 100 fixed to the respective web torch frame 54. By the arrangement thus described, it will be appreciated that concurrent rotation of Y-axis drive screws 90 by means of servo-drive motor 78 acts to shift the respective drive sleeves 92 along the drive screws. Springs 98 are sufficiently strong to normally hold each angle member 100 in closely fitting relation to the respective sleeve plate 94, whereby each web torch frame 54 is moved along Y-axis guides 52. Thus, the web torches 64 are concurrently precisely moved in the Y-axis attendant to operation of Y-axis servo-drive motor 78.

In essence, the captively held springs 98 on pins 96 resiliently couple each of the web torch frames 54 to its respective Y-axis drive sleeve and drive screw. This arrangement desirably facilitates use of the present apparatus for cutting structural members exhibiting normal manufacturing tolerances or other irregularities. For example, it is not unusual for the top and bottom flanges of an I-beam to not be perfectly parallel to one another. Thus, attendant to concurrent movement of web torches 64 by operation of the Y-axis servo-drive arrangement, it is possible that one of the web torches can approach and contact the I-beam flange positioned adjacent thereto before the other of the web torches has been moved into the desired position relative to its associated flange. Thus, even though the associated preprogrammed controls might continue to operate servo-drive motor 98 to rotate drive screws 90 after one of the web torches 64 has contacted its adjacent flange, resistence to movement of either of the web torch frames 54 merely results in compression of springs 98. By virtue of this resilient coupling of the angle member 100 to the drive sleeve 92, inadvertant damage to the web torches in avoided.

While vertical movement of the web torches 64 by means of their respective fluid rams 72 facilitates positioning and subsequent floating of the web torches, it will be appreciated that more precise and continuous control of the cutting torches provided for cutting the I-beam top and bottom flanges is desirable. The arrangement whereby Z-axis movement of the flange cutting torches is effected will now be described.

It will be noted that the illustrated embodiment of the present apparatus is such that both web torches 64, and both flange torches as will be described, are all arranged in the same vertical plane. Thus, the servo-drive arrangement for effecting precise X-axis positioning and movement of web torches 64 likewise facilitates precise X-axis positioning and movement of the flange torches of the apparatus.

With particular reference to FIGS. 3 and 4, and FIGS. 6-8, a Z-axis servo-drive mechanism is provided which includes a Z-axis servo-drive motor 106 mounted on the "top flange" one of second carriages 50. The servo-drive motor 106 is operatively coupled to an elongated Z-axis telescopic shaft 108 carried by shaft bearings 110. Like the Y-axis telescopic shaft 82, telescopic shaft 108 extends generally between flange torch frames 56 of second carriages 50, with the telescopic nature of the shaft permitting the desired relative movement of the second carriages with respect to each other along the Y-axis.

Opposite ends of the shaft 108 are operatively connected with respective drive belts 112, which in turn are operatively connected with a pair of stub shafts 114. Stub shafts 114 are respectively mounted on the second carriages 50 by means of cantilevered supports 116 which extend from respective support members 118 fixed to the respective flange torch frames 56.

Stub shafts 114 are respectively operatively connected with right-angle drive couplings 120, which in turn are respectively operatively connected with thrust bearing assemblies 122. Each of the bearing assemblies 122 is operatively connected with a respective, vertically oriented Z-axis drive screw 124. Each Z-axis drive screw 124 extends generally parallel to a downwardly depending support column 126 affixed to the respective flange torch frame 56. A lower drive screw bearing 128 is provided at the lower end of each support column 126 whereby each of the Z-axis drive screws 124 is supported for rotation. In the arrangement illustrated, the pair of Z-axis drive screws are oppositely threaded.

Z-axis drive screws 124 are provided for effecting controlled vertical movement of the inwardly directed flange torches of the present apparatus. Accordingly, a pair of flange torch mounting plates 130 are provided on which a pair of flange cutting torches 132 are respectively mounted.

Guided vertical movement of the mounting plates 130, and thus the flange torches 132, is facilitated by the provision of vertically extending Z-axis guides 134 affixed to the respective one of support columns 126 by a plurality of guide supports 136. Guide sleeves 138 are in turn slidably disposed on the guides 134, with the guide sleeves fixed to the respective one of torch mounting plates 130.

Figure 7:
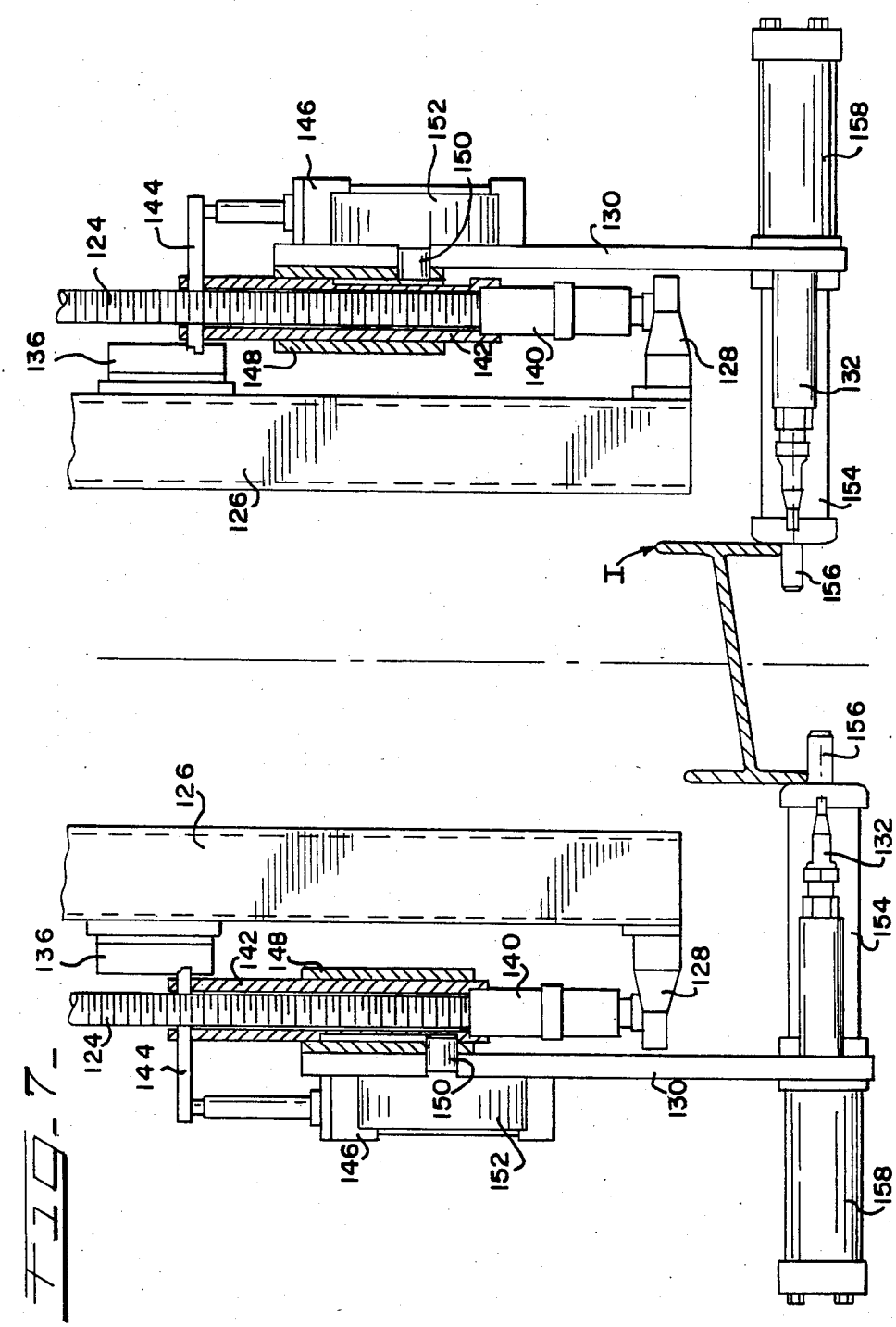
FIG. 7 is a diagrammatic view illustrating independent adjustment of a pair of the flange cutting torches of the present apparatus prior to upward movement of the torches along a vertical Z-axis for cutting.
Figure 8:
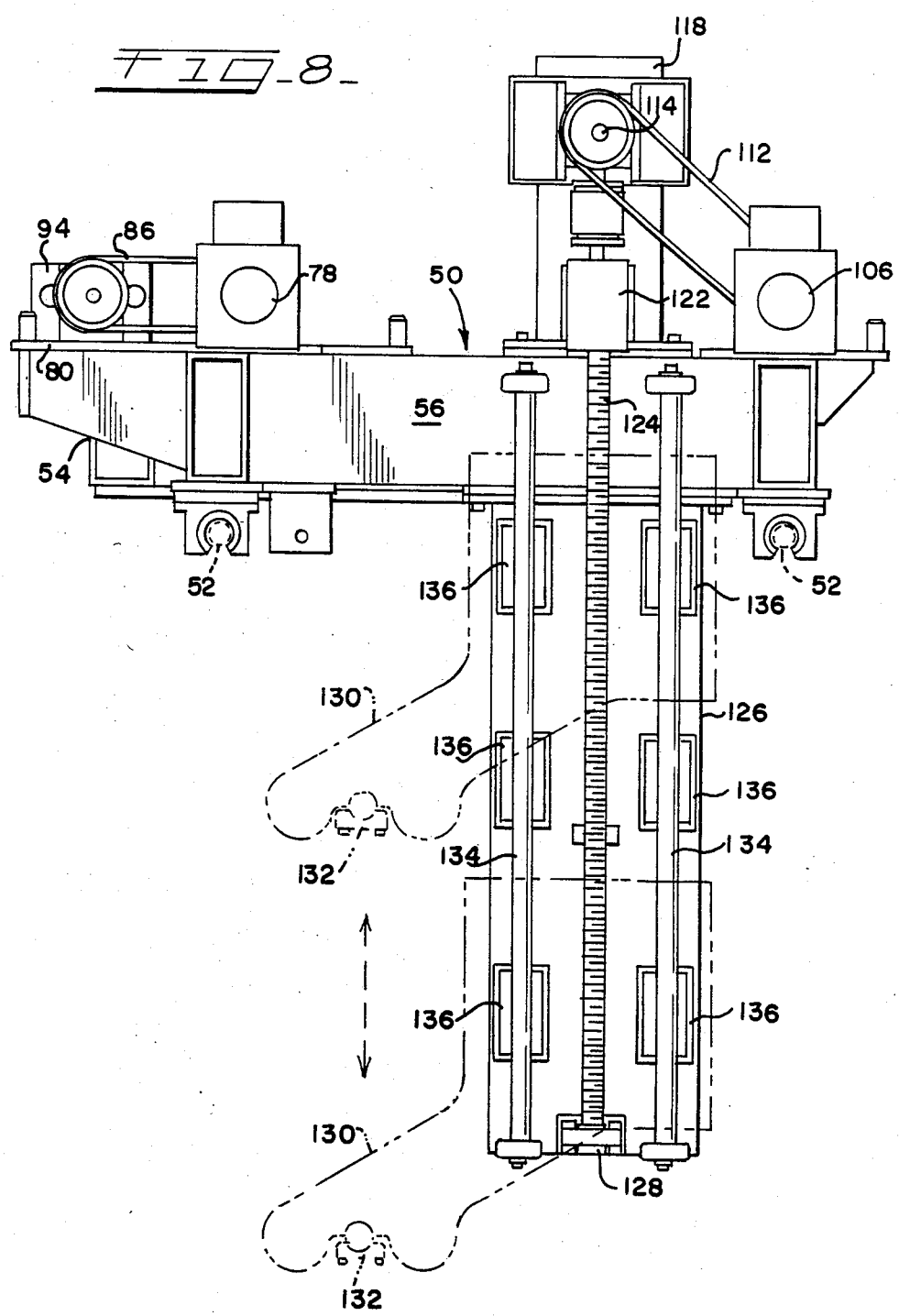
FIG. 8 is a diagrammatic view generally in side elevation of a Z-axis servo-drive arrangement of the present apparatus for vertically moving one of the flange cutting torches thereof.

By an arrangement similar to that provided for adjusting the position of first carriage 30 relative to its X-axis drive screw 34 and drive sleeve 38, each of the torch mounting plates 130 is arranged for adjustable positioning relative to its respective Z-axis drive screw 124. As best shown in FIGS. 6 and 7, an internally threaded Z-axis drive sleeve 140 is mounted on and is movable along each of the drive screws 124. Each drive sleeve 140 is in turn fixed to a non-threaded sleeve portion 142, with an arm 144 in turn connected to the sleeve portion 142.

An adjusting fluid ram 146 is mounted on each of the flange torch mounting plates 130, and is operatively connected with the respective arm 144. Each mounting plate 130 is further connected to the respective sleeve portion 144 by means of a mounting sleeve 148 slidable along the respective sleeve portion 142.

Each sleeve portion 142 defines a keyway which receives a respective locking key 150, which in turn is urged into locking engagement with the keyway by a respective locking fluid ram 152 mounted on plate 130. Thus, it will be appreciated that the position of each mounting plate 130 relative to the respective drive screw 124 is readily adjusted by operation of associated adjusting fluid ram 146, followed by pressurization of respective locking fluid ram 152 for fixing the position of the mounting plate 130 relative to the respective drive screw 124.

As previously noted, the fluid rams 58 and 60 provided for moving second carriages 50 along the Y-axis of the apparatus are desirably pressurized during cutting with flange torches 132 whereby the flange torches are urged generally toward the workpiece. In order to optimally position the torches relative to the workpiece, each flange torch has operatively associated therewith a pair of flange torch pads 154 mounted on the respective mounting plate 130.

Efficient operation of the present apparatus is promoted by the manner in which its flange torches can be referenced relative to a workpiece prior to commencement of flame cutting. To this end, probe means in the form of extensible, plunger-like probes 156 are preferably provided on each of the mounting plates 130, and in the most preferred form illustrated, positioned within torch pads 154. Probe rams 158 are provided for extension and retraction of the probes. Probes 156 are arranged for engagement with a workpiece positioned on roller conveyor 14, and to this end, the roller conveyor is preferably configured such that the probes 156 can be extended beneath the pass line of a workpiece positioned on rollers 16 (see FIG. 5).

OPERATION

A complete cycle of operation of the present apparatus will now be described in detail. As noted, associated programmed controls are preferably provided whereby a number of the different operational steps are automatically effected, with control of other functions effected by the operator of the apparatus.

Initially, the various servo-drives and fluid rams of the apparatus are operated so that its various movable components are each placed in a "neutral" condition in accordance with the preprogramming for the particular workpiece stock to be cut. In establishing this neutral condition, Y-axis rams 58 and 60 are operated to move second carriages 50 away from each other, and web torches 64 are raised by rams 72. Further, the Z-axis servo-drive arrangement positions the extensible probes 156 of the apparatus generally at the "height" of the web of the I-beam.

The apparatus operator then operates roller conveyor 14 so that the end of the I-beam workpiece is moved into the apparatus. As the workpiece is advanced, the operator observes its "leading" edge, and operates the roller conveyor 14 such that the leading edge of the workpiece is longitudinally positioned between the longitudinally spaced probes 156 provided on flange mounting plates 130. In other words, the operator moves the leading edge of the workpiece into the "window" defined by the probes 156 such that the leading edge has moved past one of the probes 156 on each plate 130, but has not moved past the other of the probes on each mounting plate 130.

The workpiece is then firmly clamped in position by operation of clamps 18 and 22. The Y-axis fluid rams 58 and 60 are next operated so that second carriages 50 move relative to each other generally toward the workpiece. The second carriages move along the Y-axis until that one of the flange torch pads 154 of each carriage 50 which has been "passed" by the workpiece leading edge engages a respective flange of the workpiece. Fluid rams 58 and 60 remain pressurized substantially throughout the cutting operation, with the rams exerting sufficient force to urge torch pads 154 (and thus flange torches 132) toward the workpiece during flange cutting without hindering controlled movement of the web and flange torches.

The apparatus is next operated such that the probes 156 beyond the leading edge of the workpiece are extended (i.e., those probes which have not been "passed" by the leading edge). Next, X-axis adjusting fluid ram 40 is operated whereby first carriage 30 is moved relative to its drive sleeve 38 until one or both of the now-extended probes 156 contact the leading edge of the workpiece. Locking fluid ram 44 is then pressurized, whereby the first carriage 30 is fixed with respect to its drive sleeve 38. The extended probe plungers 156 are now retracted, and fluid pressure in adjusting ram 40 relieved. As will be appreciated, first carriage 30, (as well as the web and flange torches) of the apparatus has now been precisely oriented or referenced relative to the edge of the workpiece, irrespective of the precise position of the workpiece on the roller conveyor 14.

The web portion W of the I-beam is cut first. Torch igniters provided on the apparatus are operated by its associated controls, with the controls further operating to deliver fuel to the web torches 64. Before initiation of web cutting, the X-axis servo-drive motor 36 is operated so that the web torches are moved a predetermined distance in a direction toward the leading edge of the workpiece. This predetermined distance corresponds to the spacing between the previously-extended probes 156 and the vertical plane passing through the centerlines of web torches 64 (and flange torches 132). In this way, heating and cutting of the workpiece is initiated at its leading edge.

Web torch fluid rams 72 are next operated to lower the web torches 64 until web torch pads 74 engage the workpiece. The web torch rams 72 are then released, whereby the desired floating of the web torches along the workpiece is permitted. After a suitable pre-heat period (typically on the order of 5 to 10 seconds), the automatic controls supply cutting oxygen to the torches 64, whereby metal cutting is initiated, with the X-axis servo motor 36 operated for advancing first carriage 30, and thus web torches 64, longitudinally of the workpiece along the X-axis at cutting speed.

Just before X-axis movement of the web torches 64 is completed, Y-axis servo motor 78 is operated, whereby web torch frames 56 are moved by their respective Y-axis drive screws 90, with web torches 64 thus moving toward the respective top and bottom flanges of the I-beam. Both the X-axis drive screw and Y-axis drive screws are simultaneously operated for a brief period of time whereby a radius is formed in each web cut before X-axis movement is stopped, and the web torches continue to move outwardly along the Y-axis toward their respective flanges. Formation of a radius at this portion of each coping desirably abates the creation of stress risers in the I-beam.

Cutting of the web portion of the I-beam continues as web torches 64 move away from each other toward their respective flanges. It will be observed that the nozzle portion of each torch 64 has been specifically configured in length and diameter to permit web cutting to be effected as close as possible to the I-beam flanges. As previously described, the resilient coupling of each web torch frame 56 to its respective drive screw 90 further facilitates cutting of the web substantially completely up to the flanges.

Upon completion of web cutting, the associated controls turn off the web torches 64. The respective fluid rams 72 are operated whereby the web torches 64 are moved upwardly to an out-of-the-way disposition.

Cutting of the I-beam flanges is now initiated. As the web torches are withdrawn, the automatic controls of the apparatus initiate ignition of the flange torches 132. The controls further operate Z-axis servo motor 106 such that the flange torches are moved to their lowermost positions (see FIG. 5). In this position, one of the probe plungers 156 provided on each of the mounting plates 130 is extended. Preferably, the plunger to be extended will be the one which previously remained retracted during referencing of the apparatus along the X-axis (i.e., that probe 156 on each plate 130 not "passed" by the workpiece leading edge). In this way, contact with the I-beam is assured, even if a longitudinal coping is being formed which is of a lesser dimension than the distance between the two plungers 156 on each mounting plate 130.

The adjusting action of the flange torches 132 relative to their respective Z-axis drive screws 124 is best illustrated in FIG. 7. As will be recognized by those familiar with the art, it is not unusual for an I-beam to exhibit some irregularity in the relative orientation of its top and bottom flanges. Such irregularities can include a misalignment of the flanges, as illustrated in exaggerated form in FIG. 7. However, it is typical for the flanges to be of the specified dimension, and thus programmed movement of the flange torches 132 is desirable once each flange torch has been oriented relative to its respective flange.

With the plungers 156 extended as illustrated in FIG. 7, the adjusting fluid rams 146 fixed to each mounting plate 130 are operated until each respective plunger 156 engages the lower edge of the respective I-beam flange. Each locking ram 152 is next operated, whereby its respective key 150 is urged into locking engagement with the respective sleeve portion 142. Fluid pressure in adjusting rams 146 is now relieved, with each of the flange torches 132 positioned just below the lower edge of its respective flange.

The automatic controls operate the Z-axis servo motor 106 to move the flange torches upwardly a predetermined distance corresponding to the vertical distance between the upper edge of plungers 156 and the centerline of the flange torches 132. Thus, the flange torches are positioned for preheating the edges of the I-beam flanges.

After suitable preheating, cutting oxygen is delivered to the torches 132, and the Z-axis servo motor 106 operated whereby the torches 132 are moved upwardly at the desired cutting speed. Notably, the automatic controls are preferably arranged so as to slow this preprogrammed cutting speed as the torches pass by the web of the I-beam, thus assuring that a clean cut is formed at the previously cut web portion.

The flange torches 132 are moved upwardly by operation of the Z-axis servo-drive until the top and bottom flanges of the I-beam are completely cut. The now-severed I-beam portions fall beneath roller conveyor 14, with the conveyor preferably configured such that a sufficiently large space is provided between rollers 16 at this region. The automatic controls next operate to turn off the torches 132, and further operate to move second carriages 50 away from each other by operation of Y-axis rams 58 and 60. Workpiece clamps 18 and 22 are operated to release the workpiece. If a similar cope is to be formed in the opposite end of the I-beam workpiece, roller conveyor 14 is operated whereby the opposite end portion is positioned longitudinally between the probe plungers 156 on each mounting plate 130, and the cycle of operation as described above repeated.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover by the appended claims all such modifications as fall within the scope of the claims.

What is claimed is:

1. An apparatus for coping a workpiece such as an I-beam, said apparatus comprising:
    means for receiving said workpiece;
    a frame positioned in association with said receiving means;
    first carriage means mounted on said frame generally above said receiving means for movement along an X-axis parallel to the longitudinal axis of said workpiece;
    second carriage means mounted on said first carriage means for movement therewith along said X-axis, said second carriage means being movable along said first carriage means along a horizontal Y-axis perpendicular to said X-axis;
    web cutting torch means mounted on said second carriage means for movement therewith along said X-axis and said Y-axis;
    means for vertically moving said web torch means along a Z-axis perpendicular to said X-axis and said Y-axis;
    flange cutting torch means mounted on said second carriage means for movement therewith along said X-axis and said Y-axis; and
    means for vertically moving said flange torch means along said Z-axis,
    whereby each of said web torch means and said flange torch means is selectively movable along each of said X-axis, said Y-axis, and said Z-axis for cutting said workpiece.

2. A coping apparatus in accordance with claim 1, wherein
    said receiving means comprises a roller conveyor, said apparatus including workpiece clamping means operatively positioned at said roller conveyor for clamping said workpiece in a fixed position during cutting thereof.

3. A coping apparatus in accordance with claim 1, including
    X-axis servo-drive means for selectively moving said first carriage along said X-axis, and means for selectively adjusting the position of said first carriage means relative to said X-axis servo-drive means.

4. A coping apparatus in accordance with claim 3, wherein
    said X-axis servo-drive means comprises an X-axis drive screw mounted on said frame, and an X-axis drive sleeve mounted on said drive screw for movement therealong, said drive sleeve being operatively connected with said first carriage means,
    said adjusting means comprising means for selectively adjusting the position of said first carriage relative to said X-axis drive sleeve, and means for selectively locking said first carriage means in position relative to said X-axis drive sleeve.

5. A coping apparatus in accordance with claim 1, including
    means for moving said second carriage means along said Y-axis comprising Y-axis fluid ram means, said Y-axis fluid ram means being operable to urge said flange torch means toward said workpiece during vertical movement of said flange torch means along said Z-axis.

6. A coping apparatus in accordance with claim 5, including
    flange torch pad means provided in operative association with said flange torch means for engaging said workpiece during cutting with said flange torch means.

7. A coping apparatus in accordance with claim 1, including
    a pair of said second carriage means each mounted for movement on said first carriage means along said Y-axis and relative to each other, each said second carriage means comprising a web torch frame and a flange torch frame independently movable along said Y-axis;
    said web torch means comprising a pair of web torches respectively mounted for vertical movement on said web torch frames, said flange torch means comprising a pair of flange torches respectively mounted for vertical movement on said flange torch frames, said apparatus including Y-axis servo-drive means mounted on said flange torch frames for selectively moving said web torch frames along said Y-axis for cutting the workpiece with said pair of web torches.

8. A coping apparatus in accordance with claim 7, including means resiliently coupling each said web torch frame with said Y-axis servo-drive means.

9. A coping apparatus in accordance with claim 1, wherein said means for vertically moving said flange torch means comprises Z-axis servo-drive means, said apparatus including means for selectively adjusting the position of said flange torch means relative to said Z-axis servo-drive means.

10. A coping apparatus in accordance with claim 9, including a pair of said second carriage means each mounted on said first carriage means along said Y-axis and relative to each other, said flange torch means comprising a pair of flange torches respectively mounted for vertical movement on said pair of second carriage means, said Z-axis servo-drive means comprising a pair of Z-axis drive screws respectively mounted on each of said second carriage means, and a pair of Z-axis drive sleeves respectively mounted on said Z-axis drive screws for movement therealong, each of said Z-axis drive sleeves being respectively operatively connected with said flange torches, said flange torch adjusting means comprising a pair of fluid ram means respectively operatively connecting each said flange torch to a respective one of said Z-axis drive sleeves for selectively adjusting the position of each flange torch relative to the respective Z-axis drive sleeve, and means for selectively locking each said flange torch relative to the respective Z-axis drive sleeve.

11. A coping apparatus in accordance with claim 1, wherein said means for vertically moving said web torch means comprises web torch fluid ram means, said web torch means being provided with web torch pad means for engagement with the workpiece after release of said web torch ram means so that said web torch means effectively floats relative to said workpiece during cutting with said web torch means.

12. An apparatus for coping a workpiece such as an I-beam having a web extending between spaced flanges, said apparatus comprising:

roller conveyor means for receiving said workpiece;

workpiece clamping means for clamping said workpiece in a fixed position on said roller conveyor means;

frame means positioned in association with said roller conveyor means;

first carriage means mounted on said frame means generally above said conveyor means for movement along an X-axis parallel to the longitudinal axis of the workpiece;

X-axis servo-drive means for selectively moving said first carriage means along said X-axis;

a pair of second carriage means mounted on said first carriage means for movement therewith along said X-axis, said pair of second carriage means being movable relative to each other along said first carriage means along a horizontal Y-axis perpendicular to said X-axis, each said second carriage means comprising a flange torch frame and a web torch frame each movable along said Y-axis;

means for moving said pair of second carriage means relative to each other along said Y-axis;

a pair of web cutting torches respectively mounted on said web torch frames of said pair of second carriage means for movement therewith along said X-axis and said Y-axis;

means for vertically moving each of said web torches relative to the respective one of said web torch frames along a Z-axis perpendicular to said X-axis and said Y-axis;

a pair of flange cutting torches respectively mounted on said flange torch frames of said pair of second carriage means for movement therewith along said X-axis and said Y-axis; and means for vertically moving said flange cutting torches relative to the respective one of flange torch frames along said Z-axis;

whereby each of said web torches and said flange torches are selectively movable along each said X-axis, said Y-axis, and said Z-axis for cutting the flanges and web of said I-beam workpiece.

13. A coping apparatus in accordance with claim 12, wherein said means for moving said second carriage means comprises Y-axis fluid ram means for moving said pair of second carriage means relative to each other, said apparatus including Y-axis servo-drive means mounted on said flange torch frames and including telescopic drive shaft means extending generally between said flange torch frames, said Y-axis servo-drive means comprising a pair of Y-axis drive screws respectively mounted on said flange torch frames to which said web torch frames are respectively operatively coupled, whereby operation of said Y-axis fluid ram means moves said pair of second carriage means relative to each other along said Y-axis, and operation of said Y-axis servo-drive means moves said web torch frames relative to each other along said Y-axis.

14. A coping apparatus in accordance with claim 13, wherein said means for vertically moving said web torches comprises web torch fluid ram means, each said web torch being provided with a respective web torch pad means for engagement with the workpiece after release of said web torch ram means so that said web torches effectively float relative to said workpiece during cutting with said web torches.

15. A coping apparatus in accordance with claim 13, wherein said means for vertically moving said flange torches comprises Z-axis servo-drive means including a pair of Z-axis drive screws respectively mounted on said flange torch frames to which said flange torches are respectively operatively connected, and telescopic Z-axis drive shaft means extending generally between said flange torch frames and operatively connecting said Z-axis drive screws.

16. A coping apparatus in accordance with claim 15, wherein said Z-axis servo-drive means further includes a pair of Z-axis drive sleeves respectively movable along said Z-axis drive screws, each said Z-axis drive sleeve being operatively connected to a respective one of said flange torches, said apparatus including means for independently adjusting the position of each said flange torch relative to the respective Z-axis drive sleeve, comprising a pair of Z-axis adjusting fluid ram means for selectively adjusting the position of each flange torch relative to the respective Z-axis drive sleeve, and a pair of Z-axis locking fluid ram means for selectively locking each said flange torch in position relative to the respective Z-axis drive sleeve, said apparatus including a pair of probe means respectively mounted for movement with said flange torches and positionable for independent engagement with said workpiece for independently referencing the positions of said pair of flange torches relative to the respective Z-axis drive sleeves, each said Z-axis locking fluid ram means being thereafter operable to lock each flange torch in position relative to its respective Z-axis drive sleeve, so that operation of said Z-axis servo-drive means moves said flange torches in concert with each other.

17. A coping apparatus in accordance with claim 12, wherein said X-axis servo-drive means comprises an X-axis drive screw, and an X-axis drive sleeve being operatively connected to said first carriage means, said apparatus including X-axis adjusting fluid ram means for selectively adjusting the position of said first carriage means relative to X-axis drive sleeve, and X-axis locking fluid ram means for selectively locking said first carriage means in position relative to said X-axis drive sleeve, said apparatus further including probe means positionable for engagement with said workpiece for referencing the position of said first carriage means relative to said X-axis drive sleeve.

* * * * *